Sept. 23, 1969 J. E. JINES ET AL 3,469,130

MEANS FOR SHIELDING AND UNSHIELDING PERMANENT MAGNETS
AND MAGNETIC MOTORS UTILIZING SAME

Filed Aug. 4, 1967 5 Sheets-Sheet 1

INVENTORS
James E. Jines &
James W. Jines
BY Ashley & Ashley
ATTORNEYS

INVENTORS
James E. Jines &
James W. Jines
BY Shley & Shley
ATTORNEYS

INVENTORS
James E. Jines &
James W. Jines

BY Shley & Shley
ATTORNEYS

INVENTORS
James E. Jines &
James W. Jines
BY Ashley & Ashley
ATTORNEYS

Sept. 23, 1969 J. E. JINES ET AL 3,469,130

MEANS FOR SHIELDING AND UNSHIELDING PERMANENT MAGNETS AND MAGNETIC MOTORS UTILIZING SAME

Filed Aug. 4, 1967 5 Sheets-Sheet 5

INVENTORS
James E. Jines &
James W. Jines

BY Ehley & Ehley

ATTORNEYS 3,469,130

MEANS FOR SHIELDING AND UNSHIELDING PERMANENT MAGNETS AND MAGNETIC MOTORS UTILIZING SAME

James E. Jines, 113 S. Main, and James W. Jines, Rte. 2, Box 83, both of Perryton, Tex. 79070

Filed Aug. 4, 1967, Ser. No. 658,549
Int. Cl. H02k *21/12*
U.S. Cl. 310—156 9 Claims

ABSTRACT OF THE DISCLOSURE

A permanent magnet, the magnetic field of which may be selectively made effective or ineffective and a magnetic motor utilizing such magnets arranged in two staggered annuli with means for selectively rendering the magnets operative and inoperative in successive order to draw a rotor from the field of one magnet to the next successive magnet, thereby causing the rotor to rotate and drive a power shaft, coupled with means for regulating the speed of rotation of the motor and the power shaft.

BACKGROUND OF THE INVENTION

Field of the invention.—The invention pertains to the field of permanent magnets of the bar type with means for rendering the magnet fields of the magnets effective or ineffective, together with a magnetic motor utilizing such magnets.

Description of the prior art.—The only prior art of which applicant is aware are U.S. Letters Patent No. 265,485, 936,503 and 2,779,900.

SUMMARY OF THE INVENTION

The invention involves permanent magnets of the bar type completely encased in a material capable of shielding and containing a magnetic flux field, such as relatively soft metallic material of the group consisting of soft iron, soft steel or other similar magnetic responsive material with one pole face thereof exposed and a shield of similar shielding material which may be moved onto the exposed pole to short circuit the magnetic flux field of the magnet and render the magnet inoperative as a magnet, or may be moved off of the exposed pole to cause the magnetic flux field to become effective, together with at least two stators spaced apart in parallel relationship and carrying annuli of such magnets facing one another, the magnets of one annuli being staggered with respect to the magnets of the other annuli and a rotor rotatably mounted between the stators having a soft iron block at one margin for attraction by successive ones of the magnets to rotate the rotor and the power shaft attached thereto, cam means carried by the rotor for selectively and successively shielding and unshielding the magnets in a circular pattern, together with means for controlling the area of the magnet poles exposed by the shields.

A construction designed to carry out the invention will be hereinafter described, together with other features of the invention.

The invention will be more readily understood from a reading of the following specification and by reference to the accompanying drawings, wherein examples of the invention are shown.

DESCRIPTION OF THE PREFERRED EMBODIMENTS

Figure 1:
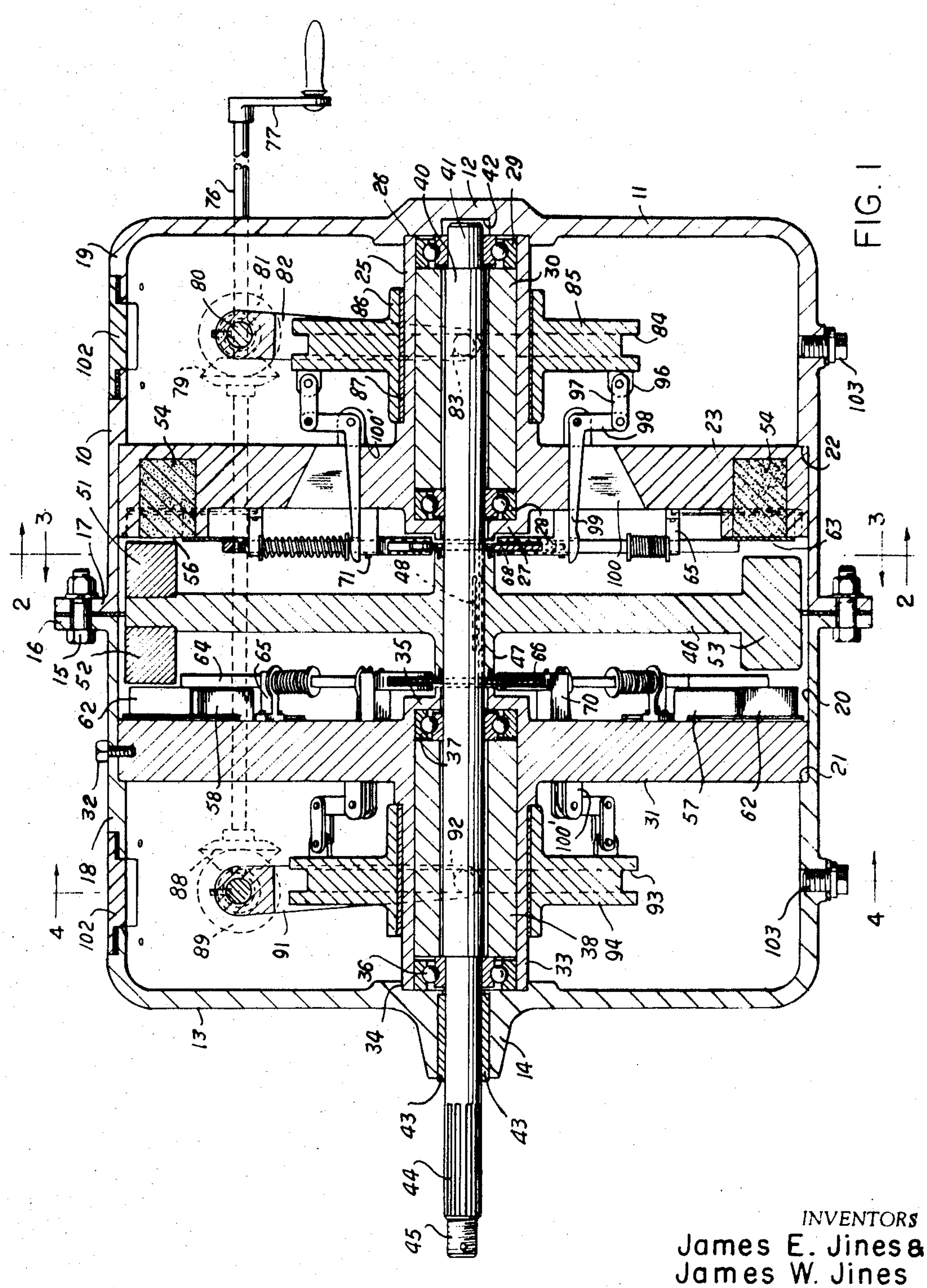
FIG. 1 is a vertical, longitudinal, sectional view of a magnetic rotor constructed in accordance with this invention, and taken on the line 1—1 of FIG. 2.

In the drawings, the numeral 10 designates an elongate, hollow, cylindrical housing having a right-hand end wall 11 with a centrally located boss 12. The housing also has a left end wall 13, having a central bearing neck 14, the housing being divided into two halves 18 and 19 and joined together around its center portion by bolts 15 joining radially outwardly extending flanges 16 and 17 formed no the two halves 18 and 19, respectively, of the housing.

The interiors of the adjoining ends of the two housing halves are cut away circumferentially of the housing to form an elongate annular recess 20 and left and right hand opposing shoulders 21 and 22. A right hand, circular stator 23 extends transversely of the right hand half 19 of the housing, abutting the shoulder 22, and being held in position by bolts 24 extending through the wall of the housing half 19 into the right hand stator 23. The right hand stator 23 has an axial, integral collar 25 extending toward the end wall 11 and engaging in a circular recess 26 formed in the boss 12 thereof. An offset axial neck 27 is formed on the opposite face of the right hand stator 23, and a pair of spaced ball bearings 28 and 29, respectively, are disposed at the left and right ends of the collar 25, the left hand bearing 28 being received in the offset neck 27, and the right hand bearing 29 being received in the recess 26. They are spaced apart and held in position by a spacer sleeve 30.

A left hand stator 31 is similarly mounted in the left hand portion 18 of the housing 10, being circular and snugly received in the recess 20 and held against the shoulder 21 by a plurality of radial bolts 32 extending through the wall of the housing into the margin of the stator 31. The left hand stator 31 also has a collar 33, substantially identical to the collar 25 and extending axially of the stator toward the end wall 13 with its end received in a circular recess 34 formed in the inner face of the end wall 13 in axial alignment with the neck 14. The left hand stator 31 also has an offset neck portion 35 on its inner face, facing the left hand stator 23, and left and right hand ball bearings 36 and 37 are received in the left and right hand ends respectively of the collar 33, the left hand bearing 36 being received in the recess 34 and the right hand bearing 37 being received in the offset neck 35. Again, a spacer sleeve 38 spaces the two bearings apart and holds them in position.

A power shaft 40 is rotatively received in the bearings 28, 29, 36 and 37, extending through the sleeves 30 and 38, and having its right hand end 41 reduced in diameter and received in the bearing 29, projecting into a second small, cylindrical recess 42 formed centrally of the recess 26, and its left hand end extending through a bearing sleeve 43 in the neck 14 and externally of the housing 10 with longitudinal spines 44 for receiving a suitable driven pulley, gear, or other means, its left hand extremity 45 being screw-threaded for reception of the usual retaining nut (not shown). The power shaft 40 is thus rotatably mounted in the housing and in the two stators 23 and 31 and has a power takeoff end projecting externally of the housing.

Figures 2, 9, 10:
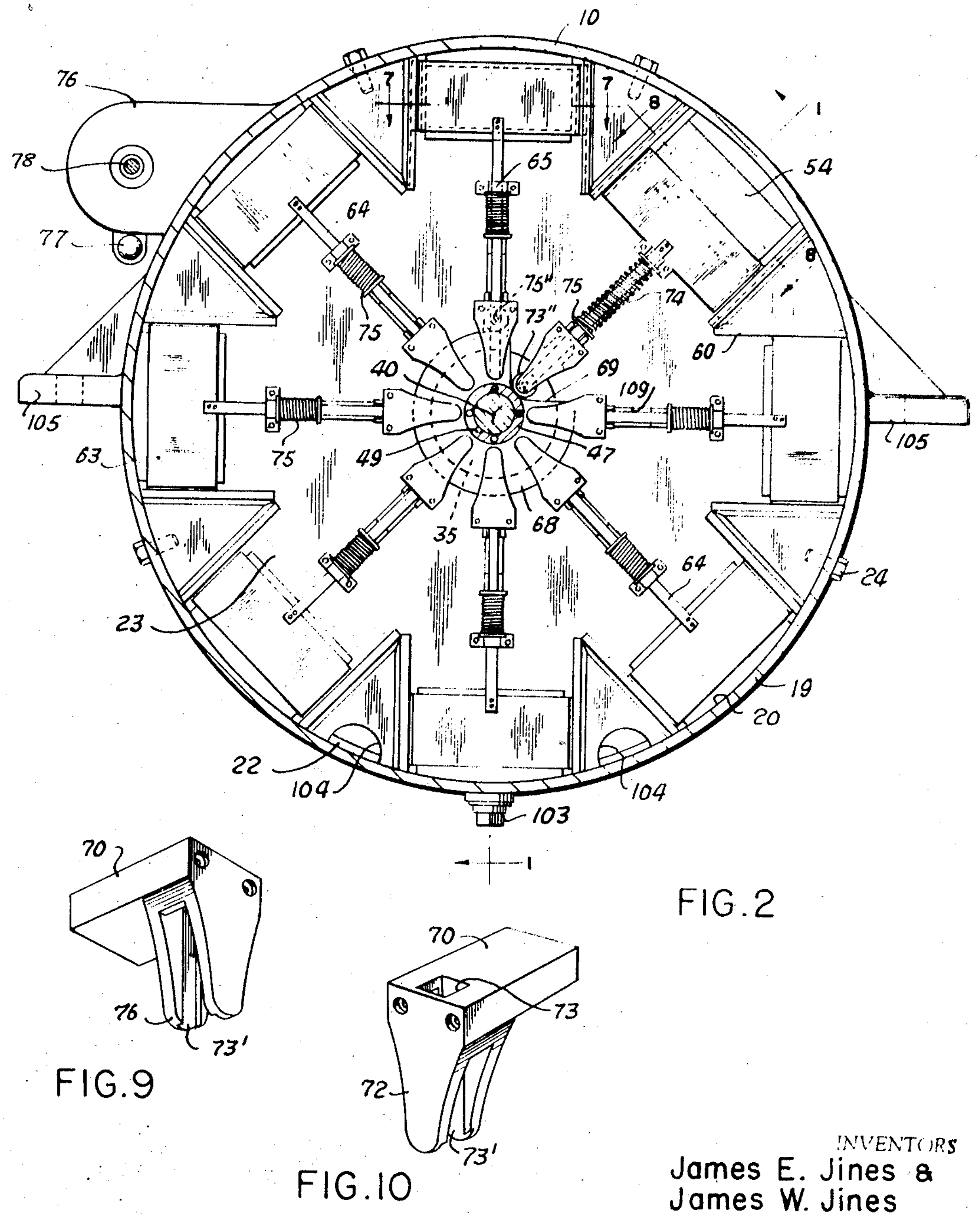
FIG. 2 is a vertical, cross-sectional view taken on the line 2—2 of FIG. 1.
FIG. 9 is an enlarged view in perspective taken from the underside of one of the cam roller guides.
FIG. 10 is a view similar to FIG. 9 taken from the upper side of the guide.
Figures 3, 6:
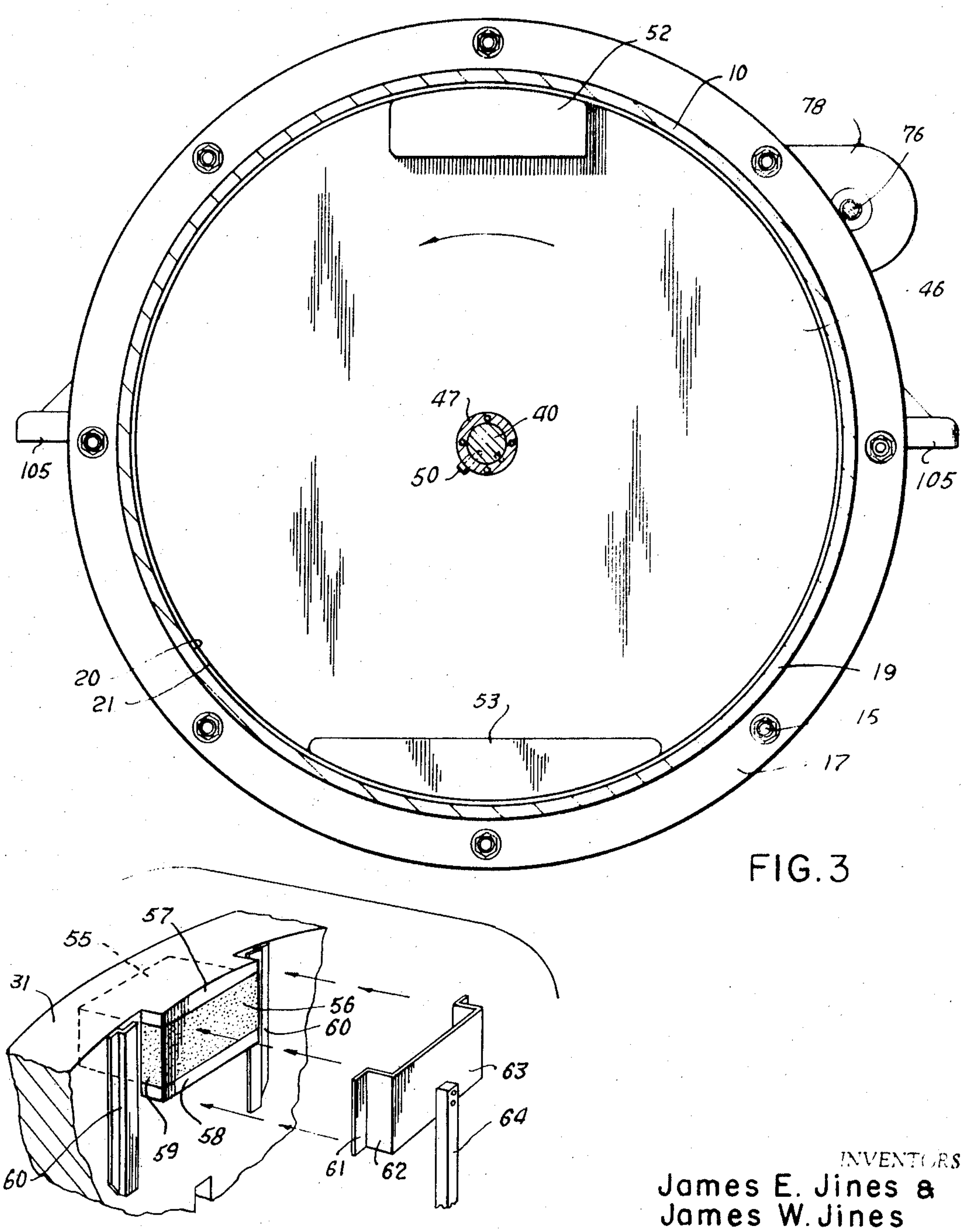
FIG. 3 is a vertical, cross-sectional view taken on the line 3—3 of FIG. 1.
FIG. 6 is an exploded view in perspective illustrating the mounting of the magnets and the shields therefor.

A circular rotor 46 of non-magnetic material has an axial hub 47 mounted upon the power shaft 40 and suitably keyed thereto as indicated in dotted lines at 48 in FIG. 1 and in solid lines at 49 in FIG. 2, a set screw 50, FIG. 3, further anchoring the key in position so that the rotor 46 revolves with and causes the power shaft 40 to revolve. The rotor 46 has a pair of magnetically responsive blocks 51 and 52, formed for instance from soft iron or steel, projecting from its right and left hand faces, respectively, at one margin thereof into close proximity with the stators 23 and 31, and a suitable non-magnetic counterweight 53 at the diametrically opposed margin from the location of the blocks 51 and 52.

The stators have annuli of heavy, permanent, bar type magnets embedded in suitable sockets formed therein, the magnets 54 of the right hand stator 23 being symmetrically disposed at 45 degree spacings around the margin of the stator, as shown in FIG. 2, the magnets 55 of the left hand stator 31 being also symmetrically disposed about the margin thereof, but being offset or staggered 22½ degrees with respect to the magnets 54. Of course, greater or lesser numbers of magnets may be used at differing spacings depending upon the size of the magnets and the diameter of the stators.

Only one pole face 56 of each of the magnets is exposed, and as shown in FIG. 6, the stators have upper and lower flanges 57 and 58, respectively, adjoining the pole faces 56 so that only the pole faces and a small area 59 of the side walls of the magnets can be exposed. The stators 23 and 31 are formed of a suitable material such as soft iron, soft steel or other similar magnetic responsive material so as to short circuit or shield the magnetic field of the magnets and, as will be explained, similar shields are adapted to be moved into place covering the pole faces 56 and the sidewall areas 59 of the magnets to completely short circuit the magnet, thus shielding it and closing off its magnetic field or field of magnetic flux. The stators 23 and 31 thus form casings surrounding each respective magnet 54 and 55 except for the exposed poles 56.

The shielding means includes an offset angle 60 mounted at each side of each of the magnets. The angle members 60 thus provide grooves facing the sidewalls 59 of the magnets, which grooves receive the flanges 61 carried on the forward ends of wings 62 provided at the margins of shields 63 suitably mounted upon elongated, actuating rods 64. The shields 63 are sufficiently thick as to hold and close or contain entirely the magnetic flux fields, and the bars or rods 64 are of such length and are so connected to the shields 63 in any suitable manner as to permit the soft iron blocks 51 and 52 to pass as closely as possible to the magnets 54 and 55. Thus, as the shields 63 with their wings 62 are moved by the rods 64 on and off the pole faces 56 and side faces 59 of the magnets 54 and 55, the exposed pole faces of the magnet are alternately exposed and covered, the magnetic field or magnetic flux of each magnet functioning when the shield is lowered therefrom but being rendered ineffective when the shields is moved completely over.

The rods 64 are reciprocable in brackets 65 carried by the stators 23 and 31, one of the brackets 65 being provided for each of the actuating rods 64.

Figure 5:
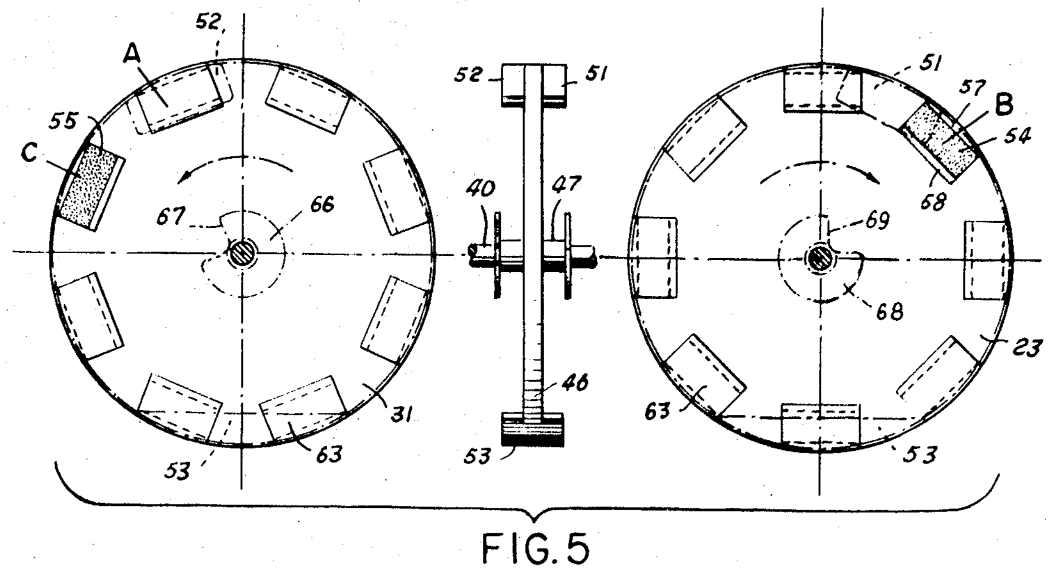
FIG. 5 is a composite, diagrammatic view illustrating the relationship of the rotor, the stators and the placement of the magnets.

The hub 47 of the rotor 46 carries on its left and right end faces annular cam elements 66 and 68, respectively, which, as shown in FIG. 2, and indicated schematically in dotted lines in FIG. 5, are essentially circular in contour, the cam 66 having radial notch 67 of some 45 degrees extent, and the similar cam disc 68 mounted upon the opposite end of the hub 47 having a similar radial notch 69 of about 45 degrees in extent but offset or staggered approximately 22½ degrees from the notch 67 in a direction opposite to the direction of rotation of the rotor 46, as shown in FIG. 5. Again, the extent of the notches and their relative staggering are subject to much variation.

Additional guides for the bars 64 are provided in the form of yoke brackets 70, adapted to be secured by the stators 23 and 31 by suitable bolts 71 and having a pair of dependent legs 72 which straddle the cams 66 and 68 and between which the cams revolve. The bracket members 70 have square guide openings 73 (FIG. 10) in their upper ends for reception of the rods or bars 64 and interval grooves 73' for further guiding of the bars. Each bar 64 has a roller 73'' on its inner end engaging the peripheries of the cams 66 and 68 and constantly urged against the peripheries of the cams by coiled springs 74 confined on the bars 64 between the brackets 65 and annular flanges 75 securely mounted upon the bars 64. Thus, the shields 63 overlie or cover all of the magnets at all times except when the cam roller 73'' of one particular shield is engaged in the notch 67 or the notch 69.

In the operation of the machine, the rotor 46 is given an initial degree of rotation as through the exposed end of the power shaft 40, and as the cams 66 and 68 revolve with the rotor, the magnets will be successfully covered and uncovered so that their magnetic force continues to drive the rotor by successfully attracting the magnetic masses 51 and 52 to successive ones of the magnets. Thus, as shown in FIG. 5, the magnetic mass 52 will just have been drawn over the magnet A of stator 31 which will then be covered by upper movement of its shield by the cam 66, and at the same time magnet B of the stator 23 will have been uncovered by the cam 68 bringing into effect the magnetic field of magnet B which will draw the mass 51 thereto over a distance of, in this instance, 22½ degrees of rotation, after which, as rotation of the rotor continues, magnet B is covered and magnet C of the stator 31 is uncovered drawing the rotor a further 22½ degrees. Thus, successive covering and uncovering of these anchored magnets arranged in two annuli is employed to drive the rotor in a circular path and to deliver power to the power shaft 40. Since permanent magnets may now be made quite strong and also of extensive useful lives, and such permanent magnets of the aluminum-nickel-cobalt alloy variety are now available that will lift as much as eighty times their own weight, it is apparent that considerable power may be developed with a purely magnetic motor.

Figure 7:
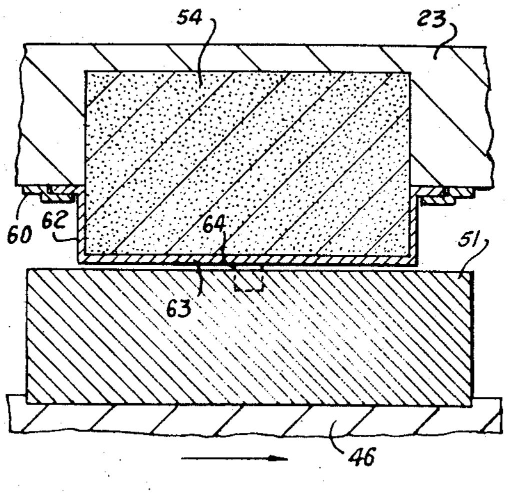
FIG. 7 is an enlarged, fragmentary, composite view taken on the line 7—7 of FIG. 2.
Figure 8:
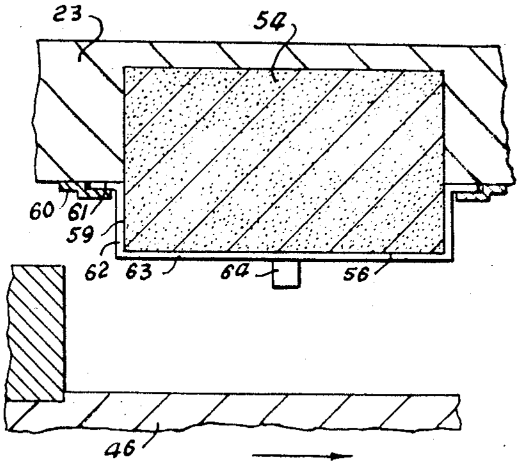
FIG. 8 is a view similar to FIG. 7 taken on the line 8—8 of FIG. 2.

It is particularly noted that any number of sets of the opposed stators with a rotor between may be connected to a single shaft in a single housing and the delivered power thus multiplied to any desired extent. This successive magnetic attraction of the masses 51 and 52 is schematically illustrated in FIGS. 7 and 8, FIG. 7 showing the mass 51 having been attracted to one of the magnets 54 whose shield 63 has been lifted into position to cut off or shield the magnet as shown in FIGS. 2 and 7, an intervening magnet of the stator 31 having next been covered and uncovered for drawing the mass 52 and the rotor further in a circular path. Then, the next magnet 54 of the stator 23 is uncovered (FIG. 8) while the mass 51 is approaching the same so that the magnetic field of the sidewall portion 59 together with the magnet pole face 56 which has been uncovered or unshielded will draw the mass 51 and the rotor further on their course.

It is quite obvious that the rotor will rotate in either direction depending upon the direction in which the power shaft 40 is given its initial rotation since the shielding and unshielding of the magnets merely takes place in reverse order.

In order to provide a speed control for the motor, means are included for controlling the extent or areas of the magnets which are shielded and unshielded, thus increasing and decreasing the magnetic fields and speeding up or slowing down the motor accordingly. This means includes a longitudinal shaft 76 having an operating handle 77 at its exposed end and extending lengthwise of the housing 10, enclosed externally thereof in a small auxiliary housing 78 and parallel to the power shaft 40. In alignment with the collar 25 of the stator 23, the shaft 76 carries a miter gear 79, and a transverse shaft 80 is trunnioned in the sidewalls of the housing half 19 overlying the collar 25. The shaft 80 has a miter gear 81 meshing with the gear 79, and the shaft 80 carries a depending fork 82 having fingers 83 engaging in the annular groove 84 of a circular disc 85 slidably mounted on the collar 25 on a bearing sleeve 86. A similar structure is provided in the half 18 of the housing 10 and is shown in full lines in FIG. 4, the shaft 76 carrying a miter gear above the collar 33 of the stator 31. Again, a shaft 90 is trunnioned in the housing half 18 and has secured thereto a depending yoke 91 having pins 92 engaging in an annular groove 93 of a circular disc 94 slidably mounted on the collar 33 on a bearing sleeve 95. It is obvious that rotation of the shaft 76 by the handle 77 will cause the yokes 82 and 91 to swing in opposite directions toward or away from their respective stators and move the disks 85 and 94 accordingly.

Figure 11:
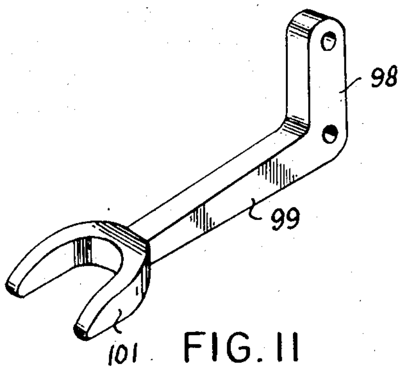
FIG. 11 is an enlarged view in perspective of one of the bell crank fork levers for controlling the areas of the magnet pole faces exposed.

For each of the permanent magnets of both stators, the disks 85 and 94 have ears 96 projecting therefrom toward the stators and being pivotally connected by links 97 to the short arms 98 of bell crank levers 99 which extend through openings 100 in the stators in alignment with the bars 64. The bell crank levers are pivotally mounted in ears 100' on the stators. As shown in FIG. 11, the bell crank levers 99 have forked inner ends 101 which straddle the bars 64 and function to engage the rings 75 to limit longitudinal movement of the bars and the extent to which the permanent magnets are uncovered. Thus, if the inner ends or forks 101 of the bell crank levers are moved longitudinally of the bars 64 toward the shield plates 63, and although they do not normally engage the flanges 75, they will limit the extent to which the shield plates can move downwardly as the roller of one of the bars enters one of the cam notches, and hence, limit the extent to which the bar may move downwardly and the extent to which the magnet shield is moved downwardly. By means of this control, greater or lesser areas of the magnetic flux fields an dthus regulate the speed of the motor. Of course, by adjusting the bell crank levers 99 all the way toward the shields, the motor will be stopped entirely.

In order to introduce lubricant into the interior of the motor as well as facilitate the assembly of certain portions thereof, an access plate 102 is provided in the upper side of each of the housing halves 18 and 19, and oil drain plugs 103 are provided in the bottom of each housing half. Further, the stator 23 has openings 104 in its lower margin through which lubricating oil may flow to and from the space between the stators. Any desired oil level may be carried within the interior of the housing cam.

Figure 4:
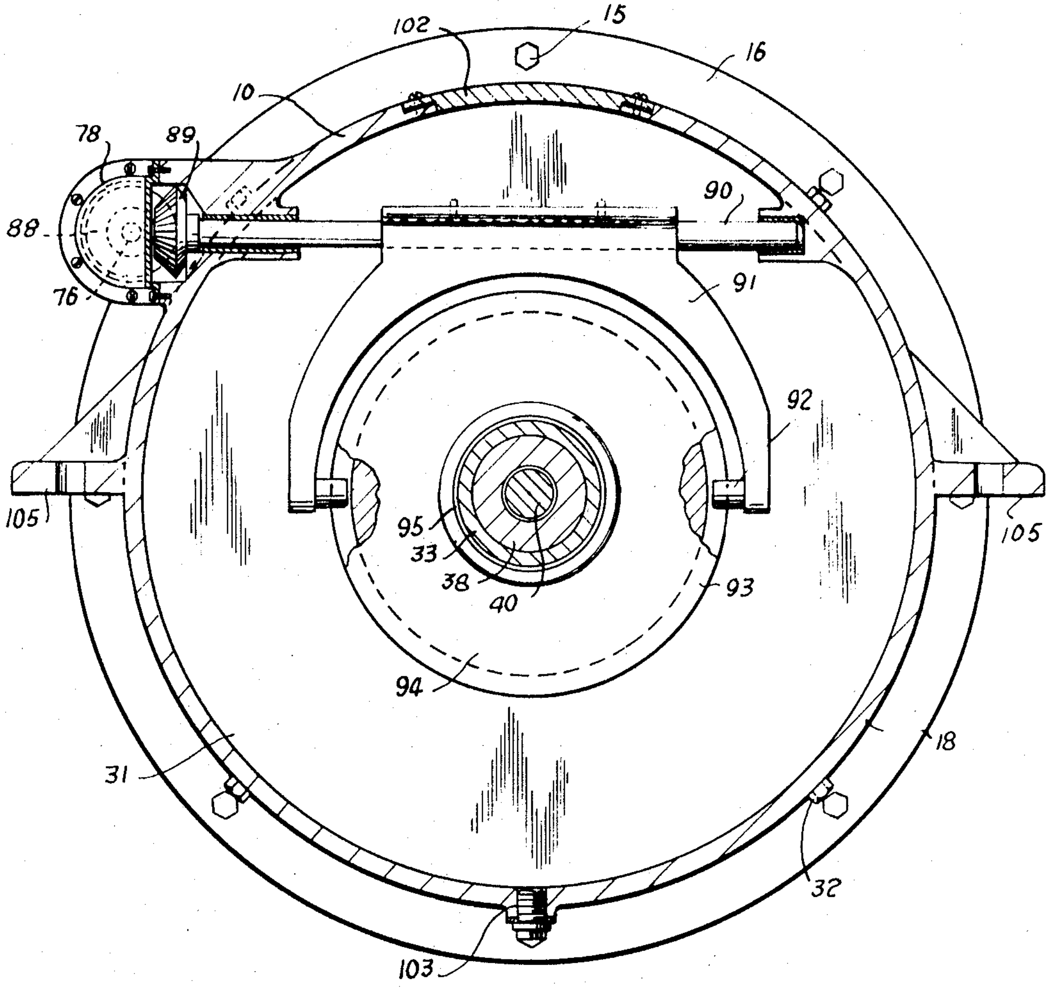
FIG. 4 is a vertical, cross-sectional view, partly broken away, taken on the line 4—4 of FIG. 1.

The motor will operate in any position, but normally it operates in the horizontal position shown, being supported upon the plurality of radial brackets 105 shown in FIG. 2 and 4.

The shields 63, the blocks 51 and 52 and the magnets 54 and 55 may be of any suitable shape and size.

The foregoing description of the invention is explanatory thereof and various changes in the size, shape and materials, as well as in the details of the illustrated construction may be made.

What we claim and desire to secure by Letters Patent is:

1. Means for shielding and unshielding a permanent magnet of the bar type including a casing formed of a material capable of shielding and containing the magnetic flux field of said magnet and completely encasing the magnet except for one end pole thereof, and a shield of similar material movable on and at least partially off of said pole and said casing to encase and unencase said pole and the magnetic flux field.

2. Means for shielding and unshielding a permanent magnet of the bar type as set forth in claim 1 wherein the material forming said casing and said movable shield is metallic and is selected from the group consisting of soft iron and soft steel having a thickness proportional to the strength of the magnetic flux field to insure the shielding and containing thereof.

3. A magnetic motor including at least a pair of fixed opposed spaced parallel stators, each stator carrying an annuli of permanent magnets of the bar type completely encased in a material capable of shielding and containing a magnetic flux field and completely encasing the magnet except for one pole thereof, a similar siheld movable on and at least partially off of each such pole to encase and unencase such pole, the unencased poles of the magnets of the two stators facing one another, the magnets of one stator being circumferentially staggered with respect to the magnets of the other stator, a power shaft mounted for rotation between the stators, a rotor on the power shaft, a magnetically responsive member on the margin of the rotor arranged to pass between the magnets as the rotor revolves with the power shaft, and means for alternatively moving the shields on and off the unencased poles of the magnets in succession around the annuli of magnets of the two stators in order to draw the magnetically responsive member to successive magnets and thus cause the rotor and the power shaft to revolve.

4. A magnetic motor as set forth in claim 3 and means for controlling the areas of the unencased poles of the magnets unencased by the shields to control the speed of rotation of the rotor and power shaft.

5. A magnetic motor as set forth in claim 3 and cam means for controlling the movement of the shields on and off the unencased poles.

6. A magnetic motor as set forth in claim 3 and cam means carried by the rotor for controlling the movement of the shields on and off the unencased poles.

7. A magnetic motor as set forth in claim 3 wherein there are a pair of magnetically responsive members on the rotor, one projecting from each side of the rotor into close proximity with the magnets.

8. Means for shielding and unshielding a permanent magnet of the bar type including a material capable of shielding and containing a magnetic flux field and completely encasing the magnet except for one pole thereof, said material having a groove formed therein on opposite sides of the unencased pole, and a shield of similar material comprising a flanged plate reciprocable over the unencased pole of the magnet, the flanges being longitudinally reciprocable in the grooves.

9. Means for shielding and unshielding a permanent magnet of the bar type including a material capable of shielding and containing a magnetic flux field and completely encasing the magnet except for one pole and portions of the side walls of the bar magnet immediately adjoining said pole, and a shield of similar material movable on and at least partially off of said pole to encase and unencase said pole.

References Cited

UNITED STATES PATENTS

| | | | |
|---|---|---|---|
| 679,304 | 7/1901 | Fish | 310—268 X |
| 2,541,906 | 9/1948 | Anderson | 310—86 |
| 3,284,746 | 11/1966 | Lenhardt | 335—237 |

WARREN E. RAY, Primary Examiner

R. SKUDY, Assistant Examiner

U.S. Cl. X.R.

310—191, 268